(12) United States Patent
Alagouda et al.

(10) Patent No.: US 12,208,353 B2
(45) Date of Patent: Jan. 28, 2025

(54) FILTER SYSTEM HAVING A PRIMARY AND A SECONDARY FILTER ELEMENT AND PRIMARY FILTER ELEMENT FOR SUCH A FILTER SYSTEM

(71) Applicant: MANN+HUMMEL GmbH, Ludwigsburg (DE)

(72) Inventors: Bharatesh Alagouda, Karnataka (IN); Vijayendran Arumugam, Karnataka (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 392 days.

(21) Appl. No.: 17/562,336

(22) Filed: Dec. 27, 2021

(65) Prior Publication Data

US 2022/0118398 A1    Apr. 21, 2022

Related U.S. Application Data

(63) Continuation of application No. PCT/EP2020/067182, filed on Jun. 19, 2020.

(30) Foreign Application Priority Data

Jun. 27, 2019    (EP) .................................. 19182968

(51) Int. Cl.
*B01D 46/64*    (2022.01)
*B01D 46/00*    (2022.01)
*B01D 46/24*    (2006.01)

(52) U.S. Cl.
CPC ......... *B01D 46/64* (2022.01); *B01D 46/0005* (2013.01); *B01D 46/2414* (2013.01);
(Continued)

(58) Field of Classification Search
CPC .......................... B01D 46/64; B01D 46/0005; B01D 46/2414; B01D 2265/025;
(Continued)

(56) References Cited

U.S. PATENT DOCUMENTS 7,828,870 B1    11/2010    Rech et al.
9,346,001 B2    5/2016    Kato et al.
(Continued)

FOREIGN PATENT DOCUMENTS

EP         3470129 A1    4/2019

*Primary Examiner* — Robert A Hopkins
*Assistant Examiner* — Qianping He

(57) ABSTRACT

A filter system (100) having a housing (110), a fluid inlet (102) formed in a housing wall (112), a fluid outlet (108) formed in a housing wall (120), a primary filter element (50) and a secondary filter element (10). The secondary filter element (10) arranged on a stand pipe (150) rigidly connected to one of the housing walls (120). The primary filter element (50) comprises a first end cap (52) at its top region (53) and a second end cap (54) at its bottom region (55). The housing wall (120) accommodates the stand pipe (150) and the bottom region (55) of the primary filter element (50), which are configured with mutual self-positioning elements (92, 62) to accommodate the primary filter element (50) on the housing wall (120) in a defined rotational position with respect to one or more struts (170) of the stand pipe (150).

19 Claims, 12 Drawing Sheets

(52) U.S. Cl.
CPC .. *B01D 2265/025* (2013.01); *B01D 2265/026* (2013.01); *B01D 2265/028* (2013.01); *B01D 2265/06* (2013.01)

(58) Field of Classification Search
CPC ........ B01D 2265/026; B01D 2265/028; B01D 2265/06; B01D 46/0031; B01D 2265/021; B01D 46/0001; B01D 46/522; B01D 46/523; B31D 5/0082
USPC .......................................................... 55/482
See application file for complete search history.

(56) References Cited

U.S. PATENT DOCUMENTS

| | | |
|---|---|---|
| 10,413,855 B2 | 9/2019 | Nelson et al. |
| 2004/0031748 A1 | 2/2004 | Kochert et al. |
| 2008/0190082 A1* | 8/2008 | Scott .................. F02M 35/0201 55/520 |
| 2009/0100813 A1* | 4/2009 | Iddings .................. B01D 46/64 55/498 |
| 2012/0067017 A1 | 3/2012 | Baseotto et al. |
| 2014/0144111 A1 | 5/2014 | Campbell et al. |
| 2016/0296868 A1 | 10/2016 | Stark et al. |
| 2016/0296869 A1 | 10/2016 | Stark et al. |
| 2018/0036667 A1 | 2/2018 | Neef et al. |
| 2019/0015770 A1 | 1/2019 | Scott et al. |
| 2019/0299143 A1 | 10/2019 | Decoster et al. |

\* cited by examiner

FILTER SYSTEM HAVING A PRIMARY AND A SECONDARY FILTER ELEMENT AND PRIMARY FILTER ELEMENT FOR SUCH A FILTER SYSTEM

CROSS REFERENCE TO RELATED APPLICATIONS

This application is a continuation application of international application No. PCT/EP2020/067182 having an international filing date of 19 Jun. 2020 and designating the United States, the international application claiming a priority date of 27 Jun. 2019 based on prior filed EPO patent application No. EP 19182968.8, the entire contents of the aforesaid international application and the aforesaid EPO patent application being incorporated herein by reference to the fullest extent permitted by the law.

TECHNICAL FIELD

The invention relates to a filter system having a primary and a secondary filter element and a primary filter element for such a filter system, in particular for an air filter system of an internal combustion engine.

BACKGROUND

It is known to use air filters in order to control combustion intake air for internal combustion engines in passenger vehicles, commercial vehicles, work machines, agricultural vehicles, but also stationary generators and the like. Such air filters generally comprise a housing, an air inlet, and an air outlet, with a removable and replaceable main or primary filter element disposed within the housing. The housing often includes a maintenance cover for access to the filter element inside the housing during maintenance. For this purpose, the filter element can be removed and either replaced by a new filter element, overtaken and reused, or replaced by a previously used, but overtaken filter element.

The filter elements of air filters are usually replaced after a certain operating time. Depending on the dust load on the filter element during usage, the service life of a filter can be several days, for example when used in construction machines, up to several months in a less dusty environment.

In particular in the case of frequent exchanges of filter elements, reliable and process-proof sealing of the filter element in a housing is important. The sealing should be temperature resistant and vibration tested. The sealing of the filter element must also be ensured on systems or devices which are exposed to strong vibrations. At the same time, however, the filter element itself should preferably not have any metallic elements, so that it can be disposed of thermally without problems. In order to protect the clean side of an air cleaner system of an internal combustion engine against penetrating dirt particles when replacing the main filter element, a so-called "secondary filter element" is used, which remains in the filter housing during replacement of the primary filter element. The secondary filter element is usually located on the clean side of the filter element, for example inside the primary filter element, and is connected to the housing of the filter system. The secondary filter element itself also has a filter medium which keeps residual dirt particles away from the filter outlet in the air stream.

Optionally, the secondary filter element itself can be exchanged as it can be loaded with dust particles. The lifetime of the secondary filter element, however, is much longer than the lifetime of the primary filter element.

U.S. Pat. No. 8,480,778 B2 discloses an air filter system in which a secondary filter element is disclosed which consists of a filter medium configured as a hollow cylinder which is closed at one side by a closed end cap and is open at the other end. With the open end it can be slipped over a support tube connected to the filter housing, thus protecting the outlet of the filter system against dirt particles. The primary filter element rests on the free end of the supporting tube and thus on the end cap of the secondary filter element. The primary filter element is mounted on the secondary filter element.

SUMMARY OF THE INVENTION

It is an object of the invention to provide a filter system for accommodating a primary filter element which ensures a defined flow characteristic of the fluid so that a mass flow sensor in the filter system has reliable operating conditions.

It is a further object of the invention to provide a primary filter element for such a filter system.

It is a further object of the invention to provide a housing wall for such a filter system.

The aforementioned object is achieved according to one aspect of the invention by a filter system comprising a housing, a fluid inlet and a fluid outlet each formed in a housing wall, a primary filter element and a secondary filter element, the primary filter element being arranged upstream the secondary filter element, the secondary filter element being arranged on a stand pipe having a longitudinal axis, the stand pipe being rigidly connected to one of the housing walls, the inside of the stand pipe being in fluid connection with the fluid outlet, wherein the primary filter element comprises a first, preferably closed end cap at its top region and a second, preferably open end cap at its bottom region, and wherein the primary filter element and the one of the housing walls accommodating the stand pipe are configured with mutual self-positioning elements to arrange the primary filter element on the one of the housing walls in a defined rotational position with respect to one or more struts of the stand pipe, as well, according to another aspect of the invention by a primary filter element for such a filter system and, according to another aspect of the invention, by a housing wall for an inventive filter system wherein a self-positioning element is arranged around a stand pipe intended to cooperate with a corresponding self-positioning element arranged at a primary filter element.

Advantageous embodiments and advantages of the invention are described in the further claims, the description and the drawings.

According to a first aspect of the invention, a filter system is proposed comprising a housing, a fluid inlet formed in a housing wall, a fluid outlet formed in a housing wall, a primary filter element and a secondary filter element, both being accommodated in the housing. The primary filter element is arranged upstream the secondary filter element, the secondary filter element being arranged on a stand pipe having a longitudinal axis, the stand pipe being rigidly connected to one of the housing walls, the inside of the stand pipe being in fluid connection with the fluid outlet. The primary filter element comprises a first, preferably closed end cap at its top region and a second, preferably open end cap at its bottom region. The primary filter element and the one of the housing walls accommodating the stand pipe are configured with mutual self-positioning elements to arrange the primary filter element on the one of the housing walls accommodating the stand pipe in a defined rotational position with respect to one or more struts of the stand pipe.

According to one preferred embodiment, a first axial end of the stand pipe is connected to the housing wall and the opposite, second axial end of the stand pope defines the top region of the stand pipe. Preferably, the connection elements of the stand pipe are positioned at the top region of the stand pipe. It is further preferred that the one or more connection elements of the secondary filter element are provided on the secondary filter element end cap such that secondary filter element and stand pipe can be mutually connected by connecting the connection elements provided on the end cap and on the stand pipe.

Advantageously, by connecting the stand pipe rigidly with the bottom wall of the housing, the positions of the longitudinal struts of the stand pipe are known. By positioning the primary filter element in a distinct rotational orientation with respect to one or more struts of the stand pipe, disturbances of the flow characteristic due to one or more longitudinal seams of the filter medium of the primary filter element and/or secondary filter element can be reduced or eliminated. When the primary filter element is replaced by a fresh one, a defined rotational position of the primary filter element can be reproduced. Additionally a reproducible position of the seam or seams with respect to a mass flow sensor can be achieved in case the primary filter element is exchanged.

It is of advantage to position the secondary filter element on the stand pipe in a similar defined rotational position with respect to one or more struts of the stand pipe. As a result, the position of the seam or seams, for example, of the secondary filter element on the stand pipe is known, too and can be reproduced when the secondary filter element is exchanged. Preferably, the secondary filter element may have a longitudinal seam. The seam can be positioned radially in front of one particular strut or, alternatively, between two longitudinal struts. In a preferred air filter system for a combustion engine this allows to position the longitudinal struts of the stand pipe and the primary filter element with respect to a mass flow sensor in a way that the flow characteristics of the fluid, i.e. air, is known in the region of the mass flow sensor and the measurements of the mass flow sensor are accurate. The mutual self-positioning elements of the primary filter element and the stand pipe enable a defined position of the longitudinal seam of the filter medium of the primary filter element. As result a flow-disturbing influence of the longitudinal seam on the flow characteristics can be reduced or even eliminated. Additionally a reproducible position of the seam or seams with respect to a mass flow sensor can be achieved in case the secondary filter element is exchanged.

Moreover, a further advantage of such a filter system is the safe and stable assembly of the primary filter element and, optionally, of the secondary filter element, as well as a very economical interchangeability of the primary filter element and, if appropriate, of the secondary filter element, in the event of maintenance.

According to a favorable embodiment, the mutual self-positioning elements comprise a radially extending protrusion and a guiding surface, the radially extending protrusion being configured to glide along the guiding surface on a relative rotational movement of the primary filter element and the one of the housing walls about a common rotational axis. Favorably, the common rotational axis may be the longitudinal axis. The primary filter element may be guided into its end position by a movement of the radially extending protrusion on the guiding surface. This allows for a reproducible mounting of a primary filter element in the housing. The guiding surface may be arranged at the housing wall or at the primary filter element. The radially extending protrusion may be arranged at the primary filter element or at the housing wall correspondingly.

According to a favorable embodiment, the radially extending protrusion may be arranged on the outside of the second end cap of the primary filter element and the guiding surface may be arranged on the inside of the one of the housing walls. In particular, the guiding surface may be arranged surrounding the stand pipe. This arrangement can be manufactured easily without altering the body of the filter medium. The radially extending protrusion may be integrated in the second end cap or a ring element embedded in the second end cap.

According to a favorable embodiment, the guiding surface may include a notch for accommodating the radially extending protrusion in its locked position. The radially extending protrusion can be locked firmly in the notch in a well-defined rotational position.

According to a favorable embodiment, a ring may be embedded in the second end cap, wherein the ring comprises one of the self-positioning elements. Advantageously, the ring can easily be embedded in the end cap during manufacturing the end cap.

According to a favorable embodiment, the secondary filter element and the stand pipe may be configured with mutual self-positioning elements to arrange the secondary filter element on the stand pipe in a defined rotational position with respect to one or more struts of the stand pipe. The mutual self-positioning elements may comprise a guiding surface and a projection element, wherein the guiding surface is intended to guide the projection element from an initial position to a final position where the secondary filter element is in its defined rotational position with respect to the one or more struts of the stand pipe. Appropriate pairs of mutual self-positioning elements can be chosen. Additionally or alternatively, the mutual self-positioning elements may comprise a contour arranged at an exterior surface of one of the stand pipe and the secondary filter element and a counter contour at an interior surface of the other one of the stand pipe and the secondary filter element. Favorably, a polygonal contour on the stand pipe can be used for mounting the stand pipe to the bottom wall of the housing in a position oriented manner. Dual use can be made of such a contour for aligning the secondary filter element on the stand pipe, too, when an appropriate counter contour is provided on the secondary filter element.

According to a further aspect of the invention a primary filter element for the inventive filter system is proposed, the primary filter element comprising a filter medium, along a longitudinal axis and a first end cap at its top region and a second end cap at its bottom region, the second end cap having a feedthrough for a stand pipe. The second end cap is provided with a self-positioning element to arrange the primary filter element on one of the housing walls of the filter system in a defined rotational position with respect to one or more struts of a stand pipe arranged on the one of the housing walls of the filter system.

The primary filter element allows for a reliable and reproducible mounting of the primary filter element into a housing.

According to a favorable embodiment of the primary filter element, a ring may be embedded in the second end cap, wherein the ring comprises one of the self-positioning elements. The self-positioning element can be easily manufactured without altering the primary filter element as such.

According to a favorable embodiment of the primary filter element, the self-positioning element may extend to the exterior of the primary filter medium. The self-positioning element can be easily manufactured without altering the primary filter element as such.

According to a favorable embodiment of the primary filter element, the first end cap may be provided with a protrusion element extending in axial direction. The filter body of the primary filter element as such does not need to be adapted to the self-positioning element. In particular, the protrusion element may be arranged eccentrically on the first end cap with respect to a centre axis of the first end cap. The centre axis may be the longitudinal axis of the primary filter element and/or the secondary filter element. The axial protrusion allows for facilitating the positioning of the primary filter element and the secondary filter element. Advantageously, the secondary filter element is configured with a corresponding recess at that end cap facing the axial protrusion of the primary filter element.

Advantageously, the inventive filter system and primary filter element can be used as an air filter, in particular as an air filter of an internal combustion engine. The safe operation of internal combustion engines is also based on safe and favorable filtering of the intake air for combustion operation, in particular with an undisturbed flow characteristic of the air at the mass flow sensor. The described filter system represents an economic and reliable possibility for this purpose. The use of the filter system as a particle filter, in particular as a particle filter of an internal combustion engine, is also advantageous. Again, the secure assembly and economic interchangeability of the described filter elements is of advantage. Conveniently, the secondary filter element may remain in the housing when the primary filter element is changed. This ensures that the clean side of the filter system is also effectively protected against penetrating dirt particles during maintenance of the filter system.

According to a further aspect of the invention a housing wall for the inventive filter system is proposed, having a primary filter element, and wherein a stand pipe for a secondary filter element is rigidly connected to the housing wall, the inside of the stand pipe being in fluid connection with the fluid outlet, and wherein a self-positioning element is arranged around the stand pipe intended to cooperate with a corresponding self-positioning element arranged at the primary filter element.

Advantageously, by connecting the stand pipe rigidly with the bottom wall of the housing, the positions of the longitudinal struts of the stand pipe are known. By positioning the primary filter element in a distinct rotational orientation with respect to one or more struts of the stand pipe, disturbances of the flow characteristic due to one or more longitudinal seams of the filter medium of the primary filter element and/or secondary filter element can be reduced or eliminated. When the primary filter element is replaced by a fresh one, a defined rotational position of the primary filter element can be reproduced. Additionally a reproducible position of the seam or seams with respect to a mass flow sensor can be achieved in case the primary filter element is exchanged.

According to a favorable embodiment of the housing wall, the self-positioning element may be arranged to accommodate the primary filter element in a defined rotational position with respect to one or more struts of the stand pipe. When the primary filter element has to be mounted to the housing, a defined rotational position of the primary filter element can be reproduced. Additionally a reproducible position of the seam or seams with respect to a mass flow sensor can be achieved in case the primary filter element is exchanged.

According to a favorable embodiment of the housing wall, the self-positioning element may be configured as a guiding surface surrounding the stand pipe. This arrangement can be manufactured easily without altering the body of the filter medium of the primary filter element or the secondary filter element. A corresponding radially extending protrusion may be integrated in the second end cap or a ring element embedded in the second end cap.

According to a favorable embodiment of the housing wall, the guiding surface has a maximum region and a minimum region arranged diametrically vis-à-vis the maximum region. Favorably, the minimum region may comprise a notch where a corresponding self-positioning element may rest in its final position.

It is to be understood that the invention can be combined with one or more of the features disclosed in the patent applications with the title "Filter system having a primary and a secondary filter element and secondary filter element for such a filter system" all filed by the applicant together with this patent application at the same day.

BRIEF DESCRIPTION OF THE DRAWINGS

Further advantages result from the following drawing description. Embodiments of the invention are shown in the drawings. The drawings, the description, and the claims contain numerous features in combination. The person skilled in the art will expediently also consider the features individually and combine them into sensible further combinations. For example.

DETAILED DESCRIPTION

Figure 1:
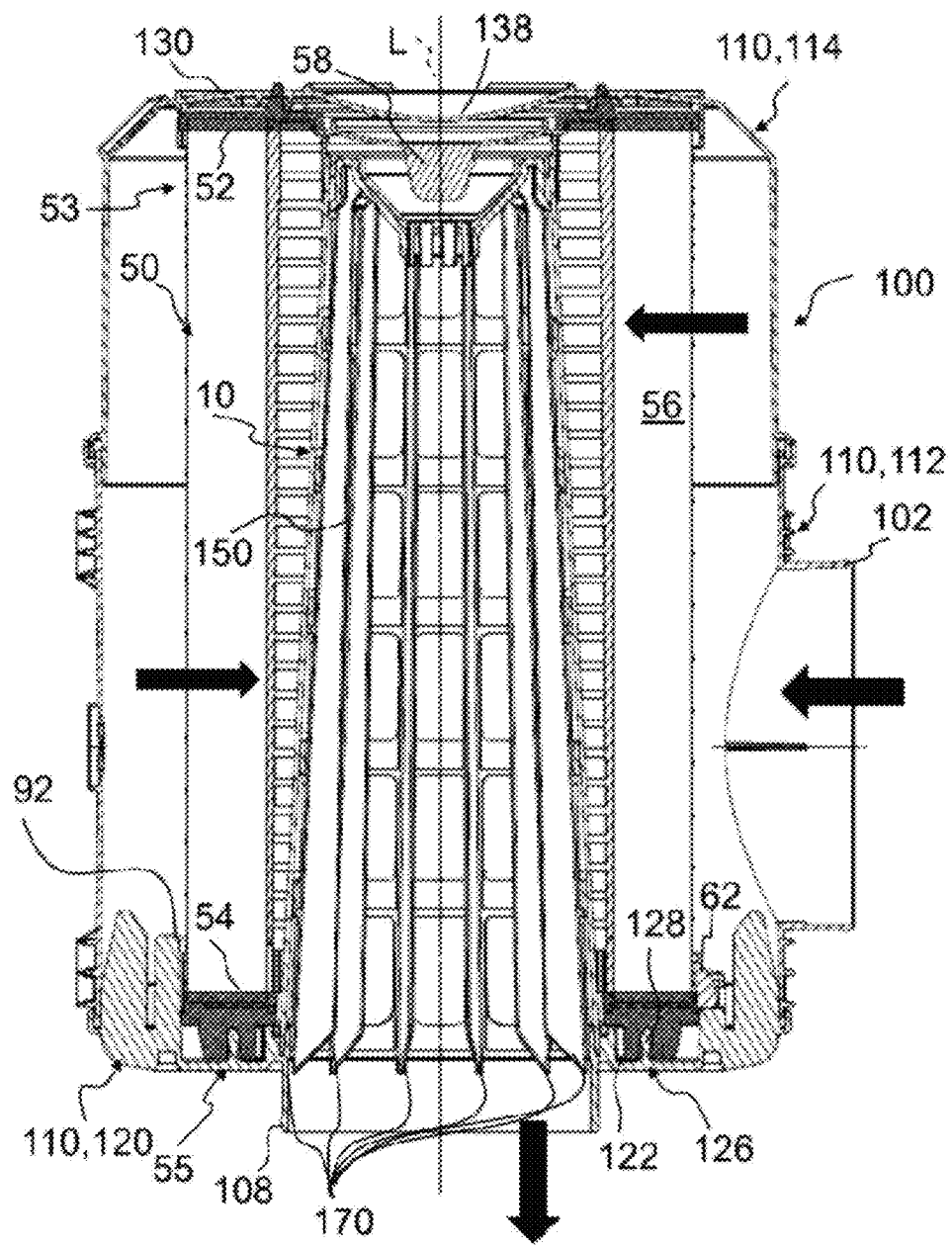
FIG. 1 shows a longitudinal cut view of a filter system according to an embodiment of the invention.

The figures show merely examples and are not intended to be limiting. Similar or equal elements are referred to with same reference numerals in the Figures.

Figure 2:
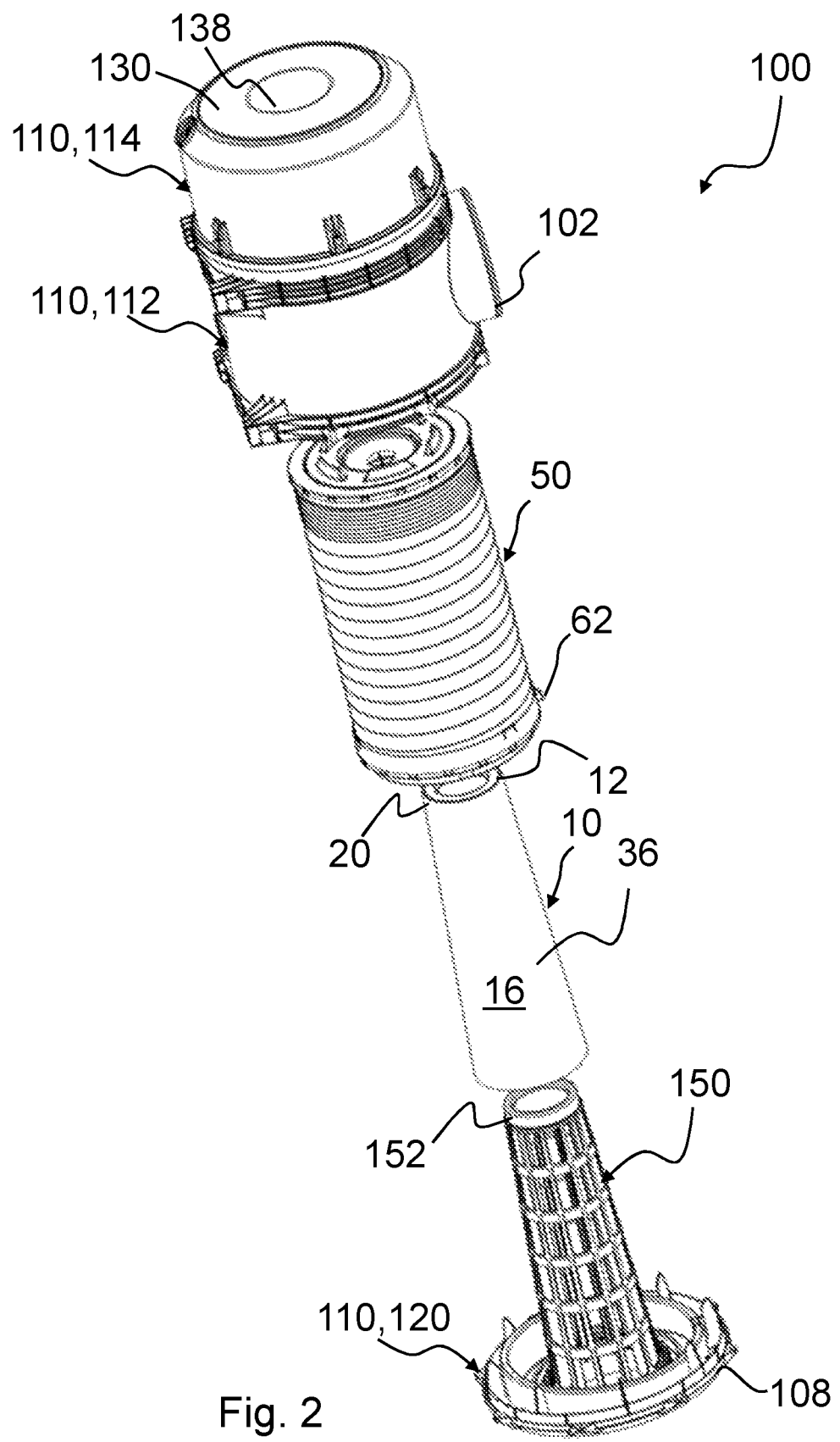
FIG. 2 shows the filter system of FIG. 1 in an exploded view.

FIG. 1 shows a longitudinal cut view of a filter system 100 according to an embodiment of the invention. FIG. 2 shows the filter system 100 of FIG. 1 in an exploded view.

The filter system 100 comprises a housing 110, a fluid inlet 102 formed in a housing wall 112, a fluid outlet 108 formed in a bottom housing wall 120. In this embodiment, the housing 110 may consist of three segments, the bottom housing wall 120, the intermediate ring-shaped housing wall 112 with the fluid inlet 102 and a cover part 114. The segments are connected to each other by, e.g., clamps, screws or the like. A hollow cylindrical primary filter element 50 is accommodated in the housing 110. For removing the primary filter element 50 for maintenance or exchange the housing walls 112, 114 can be removed from the bottom housing wall 120 together in one piece or only the cover part 114 is removed.

The body of the primary filter element 50 is made of a filter medium 56 which may be pleated, for instance. The primary filter element 50 is covered at both ends by ring shaped first and second end caps 52, 54, which are made, for example, from polyurethane which is well known in the prior art. Sealing structures and supporting ribs are arranged at the exterior sides of the first end cap 42 and the second end cap 54. The primary filter element 50 is clamped between the bottom housing wall 120 and the cover housing wall 114 in a sealing tight manner so that a fluid has to pass through the primary filter element 50 in a radial direction, which is indicated by bold arrows in FIG. 1. The second end cap 54 of the primary filter element 50 is configured to have a feedthrough for the stand pipe 150 and is accommodated in the bottom housing wall 120 which is provided with a groove 126. For radial fixation of the primary filter element 50, a ring shaped projection 128 is arranged in the groove 126.

In its front face 130, the cover part 114 is provided with a recess 138 which extends into the interior of the housing 110.

Inside the primary filter element 50, a secondary filter element 10 is arranged. The primary and secondary filter elements 50, 10 are arranged concentrically about an axis extending in a longitudinal direction L, referred to as longitudinal axis L. The secondary filter element 10 is arranged downstream the primary filter element 50 so that fluid has to pass through the secondary filter element 10 on its way to the fluid outlet 108. The secondary filter element 10 is arranged on a stand pipe 150 which is rigidly connected to the bottom housing wall 120. The lower part of the stand pipe 150 merges with the fluid outlet 108 of the bottom housing wall 120. The secondary filter element 10 comprises a filter medium 16 forming a body 36 with at least one weld seam 18 along the longitudinal direction L.

Optionally, the secondary filter element 10 comprises a closed end cap 20 at its top region 12, wherein the secondary filter element 10 and the stand pipe 150 are mutually connected at their top regions 12, 152 by connection elements. The open ended side of the secondary filter element 10 is accommodated in a circular groove 122 in the bottom wall 120.

The first end cap 52 at the top region of the primary filter element 50 is provided with a protrusion element 58 extending in axial direction towards the top region 12 of the secondary filter element 10.

The bottom region 55 of the primary filter element 50 and the housing wall 120 accommodating the stand pipe 150 are configured with mutual self-positioning elements 62, 92 to arrange the primary filter element 50 on the housing wall 120 in a defined rotational position with respect to one or more struts 170 of the stand pipe 150. The struts 170 are arranged about the longitudinal axis L and are pointing to the interior of the stand pipe 150.

In particular, a radially extending protrusion 64 is arranged at the bottom part 55 of the primary filter element 50 as self-positioning element 62. A guiding surface 94 is arranged around the stand pipe 150 as self-positioning element 92. The guiding surface 94 is formed as a ramp which has a maximum region with a maximum height in relation to the longitudinal axis L and a minimum region with a minimum height in relation to the longitudinal axis L at the opposite side of the stand pipe 150. The radially extending protrusion 64 can glide on the guiding surface 94 from the maximum region to the minimum region when the primary filter element 50 and/or the bottom housing wall 120 are rotated about the longitudinal axis L. A notch 96 is arranged in the minimum region in which the radially extending protrusion 64 of the primary filter element 50 can snap into place.

Figure 3:
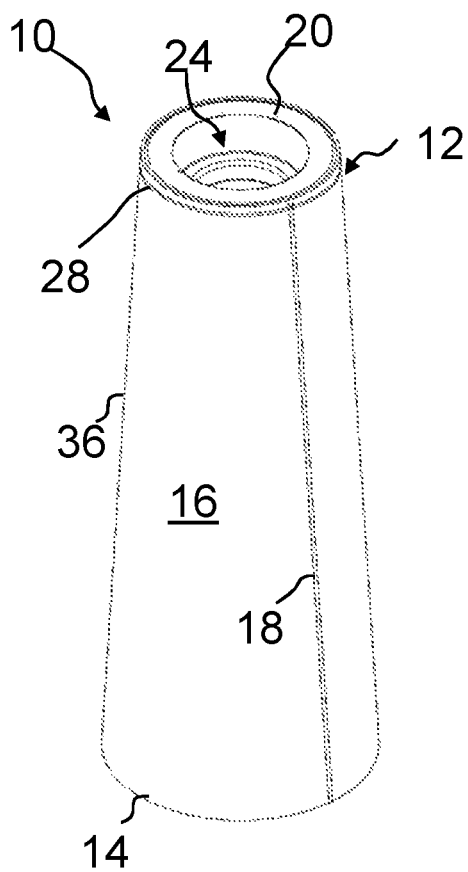
FIG. 3 shows a first embodiment of a secondary filter element with an end cap having a recess at its exterior side.
Figure 4:
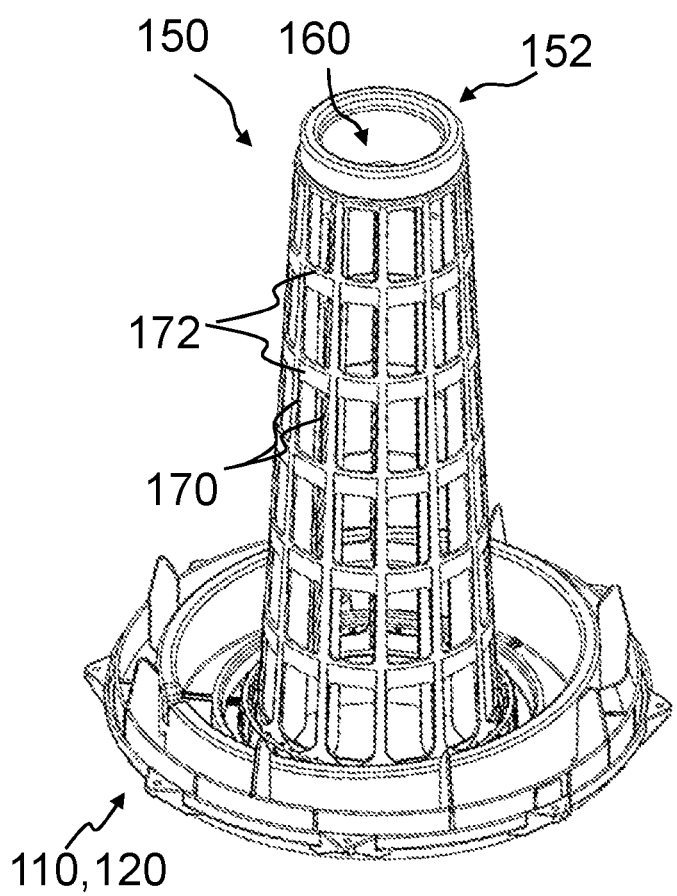
FIG. 4 shows a bottom wall of a housing of a filter system with a stand pipe attached to the bottom wall.

FIG. 3 shows a first embodiment of a secondary filter element 10 with an end cap 20 at its top region 12 having a recess 24 at its exterior side. FIG. 4 shows a bottom wall 120 of a housing 110 of a filter system 100 with a stand pipe 150 rigidly attached to the bottom wall 120 to which the secondary filter element 10 of FIG. 3 can be attached.

FIG. 3 shows a first embodiment of a secondary filter element 10 with an end cap 20 having a recess 24 at its exterior side. The secondary filter element 10 has a body 36 consisting of a filter medium 16. The filter medium 16 can be a nonwoven material, paper, cellulose or a mixed fiber of plastic and cellulose. The filter medium 16 can be designed endlessly on the circumference of the secondary filter element 10 with at least one longitudinal weld seam 18. The filter body 36 formed thereof has a conical shape with a large diameter at a bottom region 14 and a smaller diameter at the top region 12 of the body 36 where the end cap 20 is mounted. Preferably the filter medium 16 is connected to the end cap 20 by way of a circumferential weld seam 28. The recess 24 in the end cap 20 extends into the interior of the body 36.

FIG. 4 shows a bottom wall 120 of a housing 110 of a filter system 100 with a stand pipe 150 attached to the bottom wall 120. The lattice-like body of the stand pipe 150 is conically shaped and composed of longitudinal struts 170 and circumferential struts 172, only two of each are referred to with reference numerals and reference lines for clarity reasons.

The stand pipe 150 is provided as a carrier of the secondary filter element 10 as shown in FIG. 4. The secondary filter element 10 and the stand pipe 150 each comprise complementary connecting means with which they can be connected to one another at one of their end faces, shown on top of the secondary filter element 10 and the stand pipe 150 in the FIGS. 3 and 4. This allows for a safe and stable assembly of both the primary filter element 50 (FIGS. 1, 2) and the secondary filter element 10, as well as a very economical interchangeability of the primary filter element 50 and, if appropriate, of the secondary filter element 10 in the event of maintenance. The secondary filter element 10 rests firmly on the stand pipe 150. Due to the closed end cap 20 of the secondary filter element 10, even with dismounted primary filter element 50 the clean side of the filter system 100 is protected against particulate matter even if fluid is still sucked through the secondary filter element 10.

The stand pipe 150 in this embodiment comprises a receptacle 160 at its top region 152. The contour of the receptacle 160 corresponds to the exterior contour of the endcap 20 of the secondary filter element 10. The receptacle 160 has an open ended bottom which ends in a connection element 156 for the connection elements (not shown) of the secondary filter element 10. For instance, snap beams can be hooked on the bottom of the receptacle 160 as locking element and establish a snap fit connection between the stand pipe 150 and the secondary filter element 10. The receptacle 160 is funnel shaped in its bottom region so that introducing the snap beams is facilitated.

Figure 5:
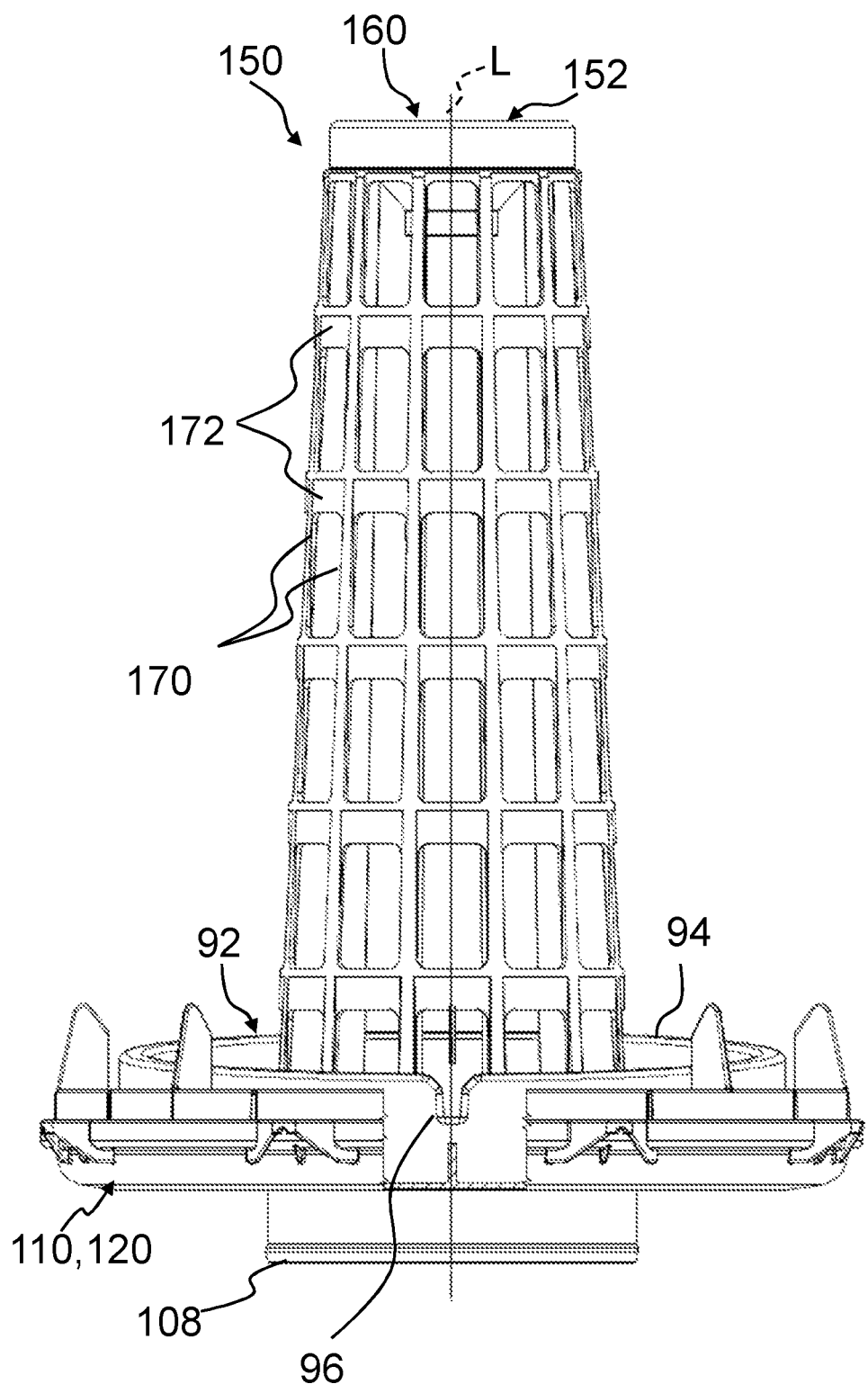
FIG. 5 shows a side view of the housing wall with a rigidly attached stand pipe according to an embodiment of the invention.
Figure 6:
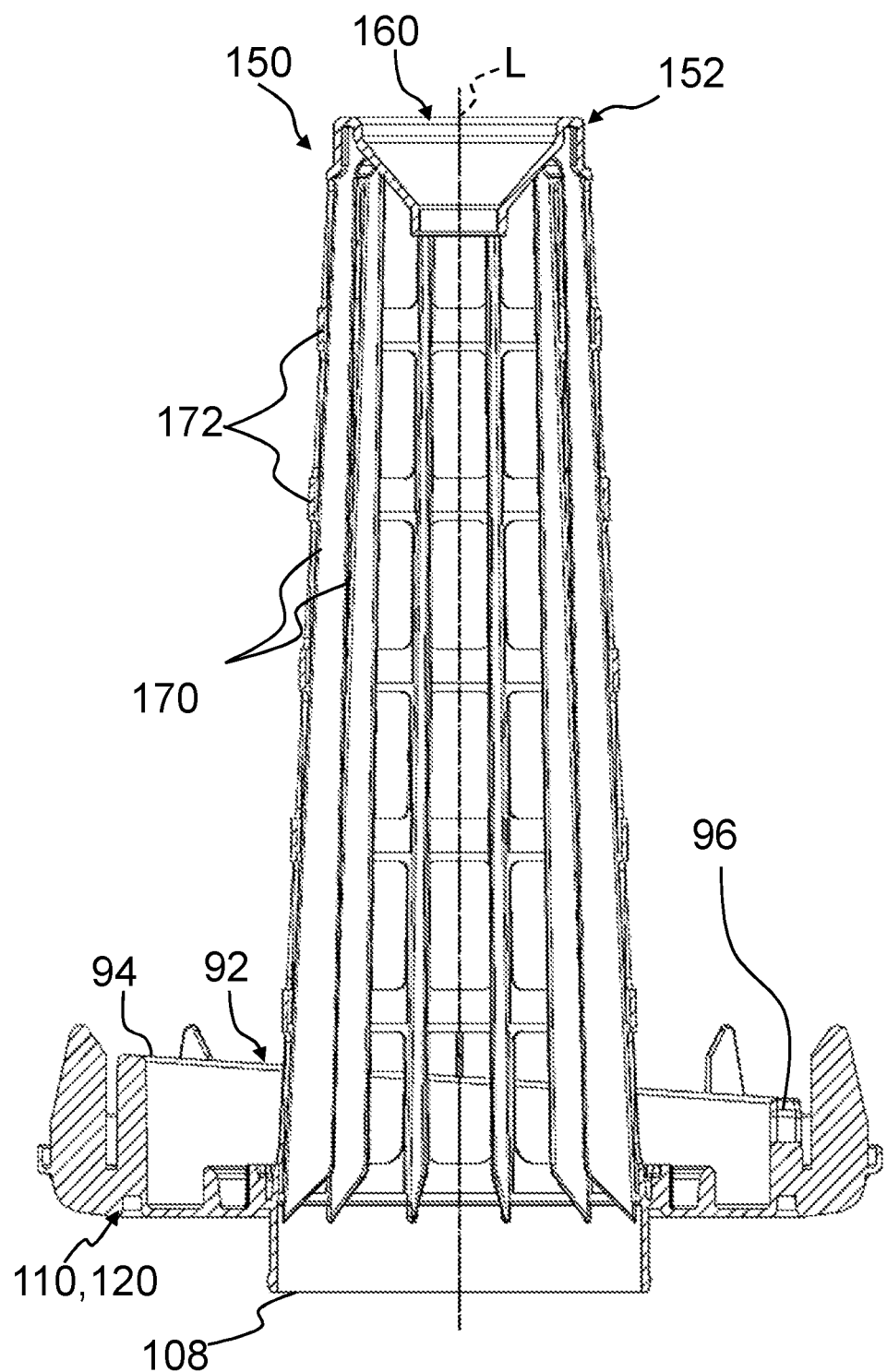
FIG. 6 shows a cut view of the housing wall according to FIG. 5 rotated by 90° about a longitudinal axis.

FIGS. 5 and 6 illustrate a bottom housing wall 120 according to an embodiment of the invention. FIG. 5 shows a side view of the housing wall 120 with a rigidly attached stand pipe 150. FIG. 6 shows a cut view of the housing wall 120 according to FIG. 5 rotated by 90° about a longitudinal axis L. The interior of the stand pipe 150 is in fluid connection with the fluid outlet 108.

The stand pipe 150 is surrounded by a self-positioning element 92 being configured as guiding surface 94 having the shape of a ring ramp. The guiding surface 94 is formed as a ramp which has a maximum region with a maximum height in relation to the longitudinal axis L and a minimum region with a minimum height in relation to the longitudinal axis L at the opposite side of the stand pipe 150. A radially extending protrusion 64 (FIGS. 1 and 2) can glide on the guiding surface 94 from the maximum region to the minimum region when the primary filter element 50 and/or the bottom housing wall 120 are rotated about the longitudinal axis L. A notch 96 is arranged in the minimum region in which the radially extending protrusion 64 of the primary filter element 50 can snap into place.

Figure 7:
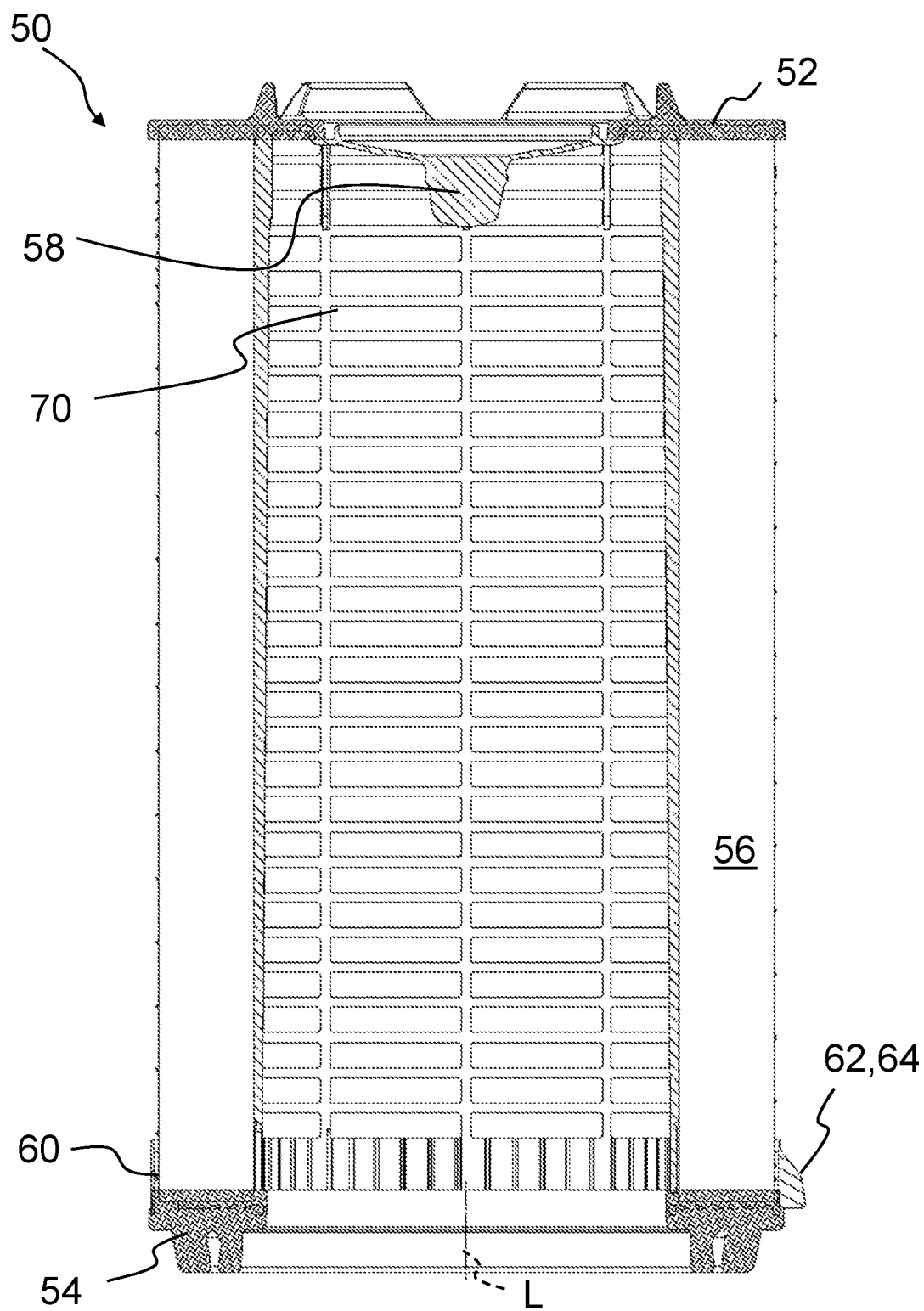
FIG. 7 shows a primary filter element according to an embodiment of the invention comprising a radially extending protrusion at the outer circumference of an end cap.
Figure 8:
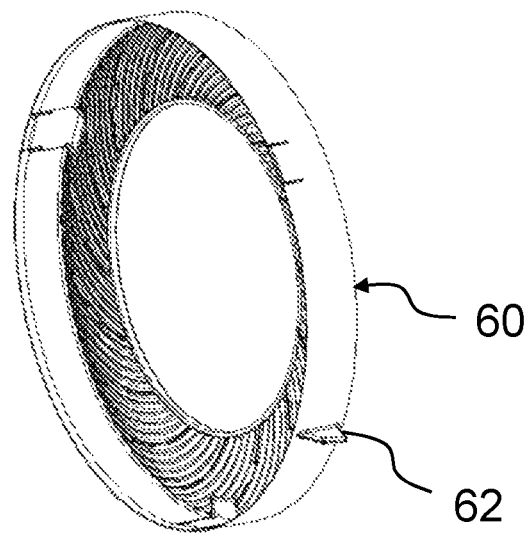
FIG. 8 shows a ring for accommodating the filter medium of the primary filter element comprising a radially extending protrusion at the outer circumference of an end cap.

FIG. 7 shows a primary filter element 50 according to an embodiment of the invention comprising a radially extending protrusion 64 at the outer circumference of the second end cap 54. FIG. 8 shows a ring 60 for accommodating the filter medium 56 of the primary filter element 10 comprising a radially extending protrusion 64 at the outer circumference of its second end cap 54. The primary filter element 50 has a filter body consisting of a filter medium 56 which extends between a first end cap 52 and a second end cap 54 which has a feedthrough for the stand pipe 150 (FIGS. 5 and 6). The filter medium 56 is attached to the outer surface of a support structure 70 arranged in the interior of the primary filter element 50. A self-positioning element 62 configured as a radially extending protrusion 64 is arranged at the second end cap 54. The radially extending protrusion 64 is part of a ring 60 which is embedded in the material of the second end cap 54. The ring 60 is shown in FIG. 8. The ring 60 accommodates the filter body consisting of the filter medium 56 in its interior. The ring 60 has an outer rim which overlaps the bottom part of the filter body in axial direction.

Figure 9:
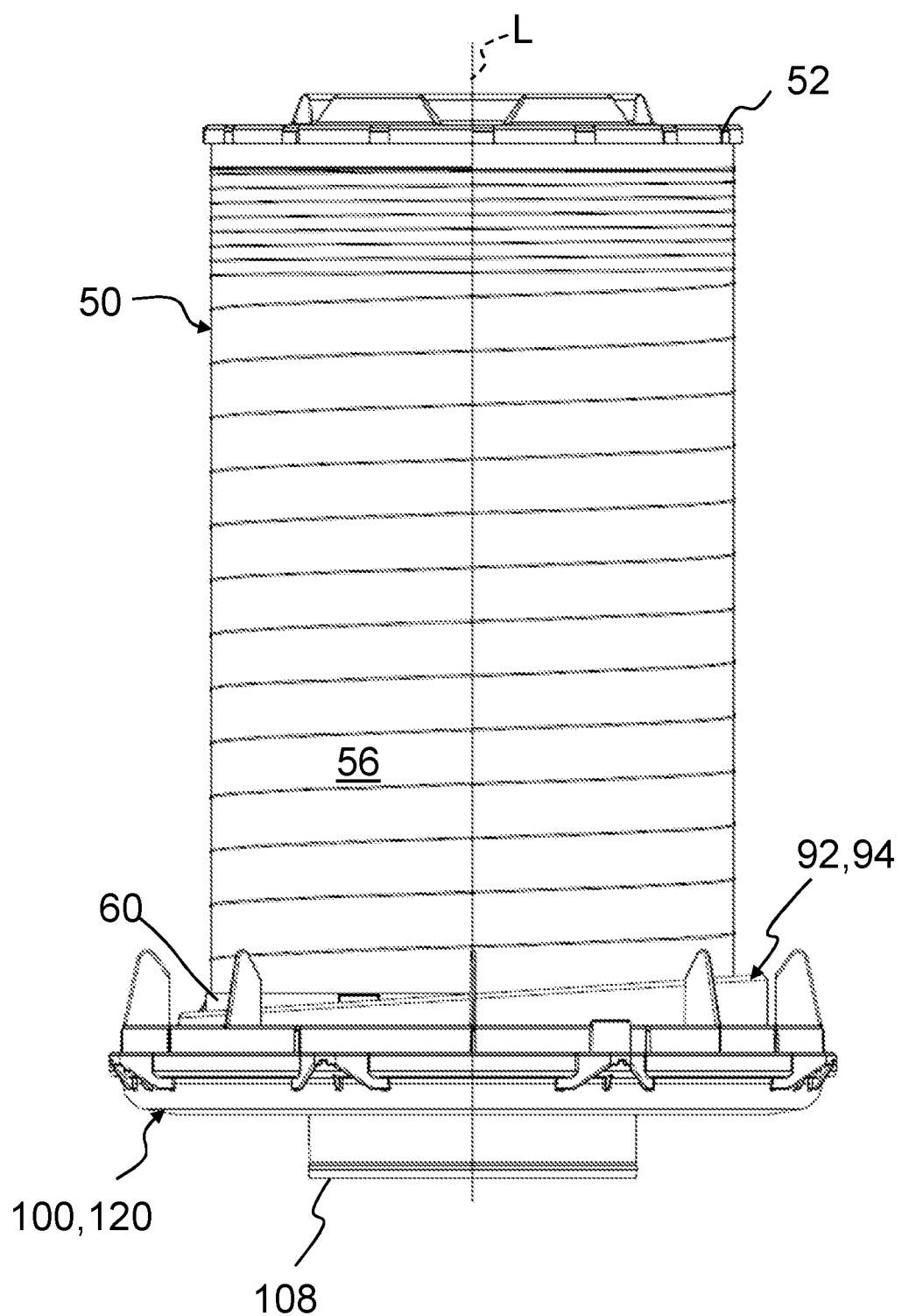
FIG. 9 shows a primary filter element mounted to a housing wall accommodating a stand pipe for a secondary filter element.
Figure 10:
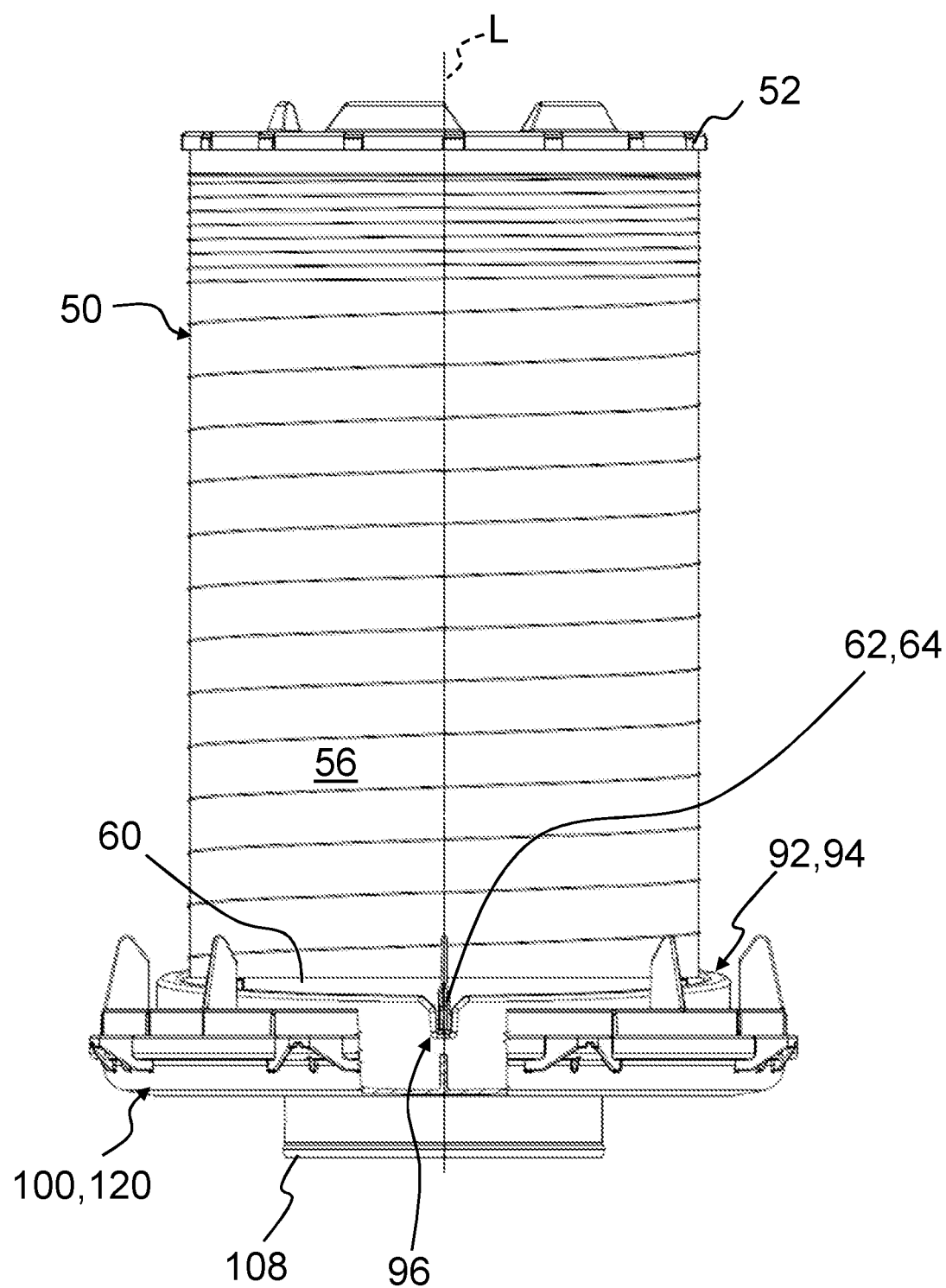
FIG. 10 shows the primary filter element according to FIG. 9 rotated by 90° about a longitudinal axis.

FIGS. 9 and 10 show side views of a primary filter element 50 mounted to a housing wall 120 in two rotational positions distinct by 90° relative to the longitudinal axis L. In FIG. 9, the guiding surface 94 is inclined from the maximum region on the right side of the primary filter element 50 to the minimum region on the left side of the primary filter element 50. In FIG. 10, the minimum region with the notch 96 is seen as front view. The radially extending protrusion 64 is snapped into the notch 96 and secures the rotational position of the primary filter element 50 in the bottom housing wall 120.

Figure 11:
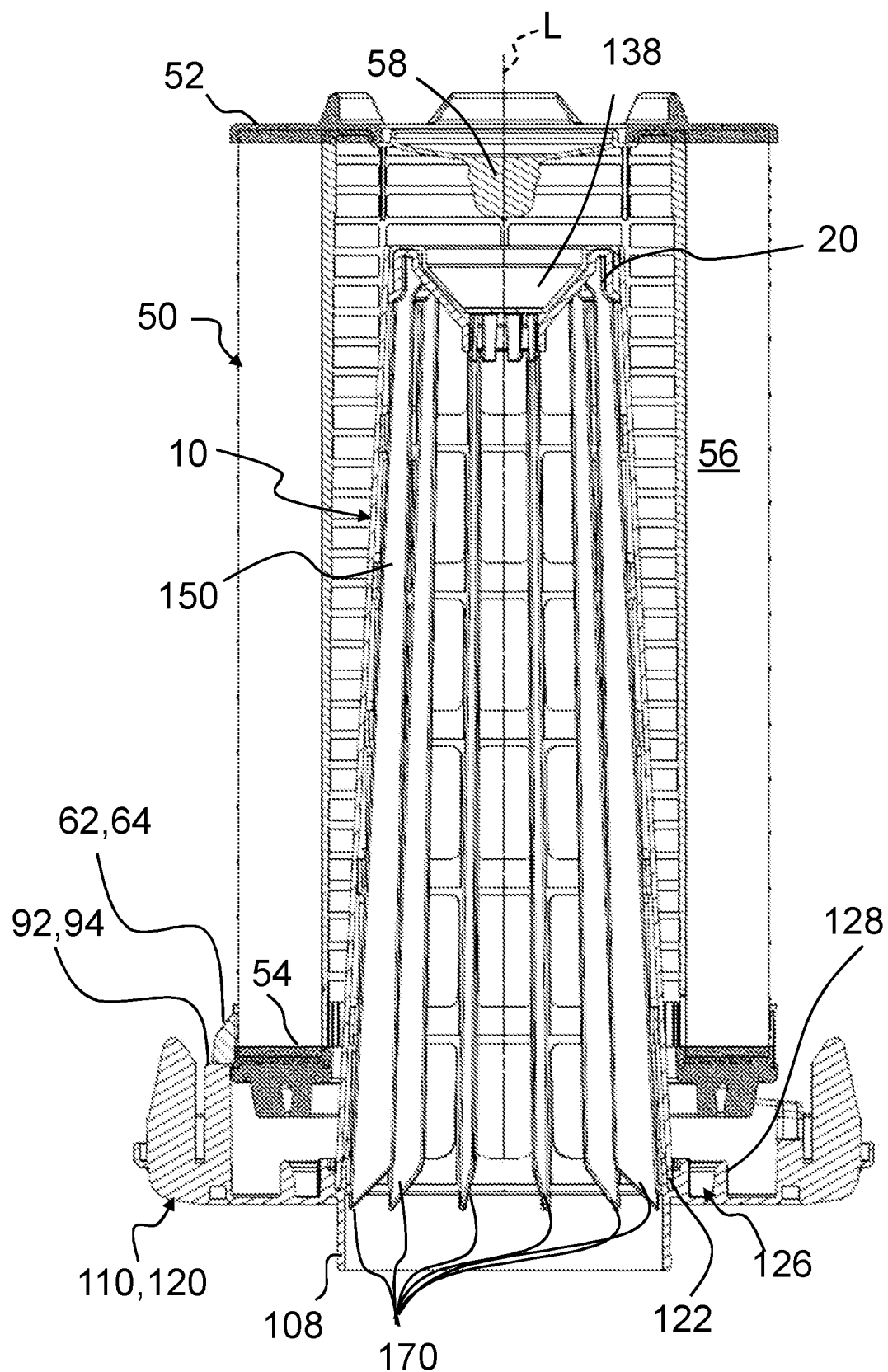
FIG. 11 shows a cut view of the primary filter element according to FIG. 9 rotated by 180° about a longitudinal axis in a state where the filter element is mounted to the housing wall accommodating the stand pipe.
Figure 12:
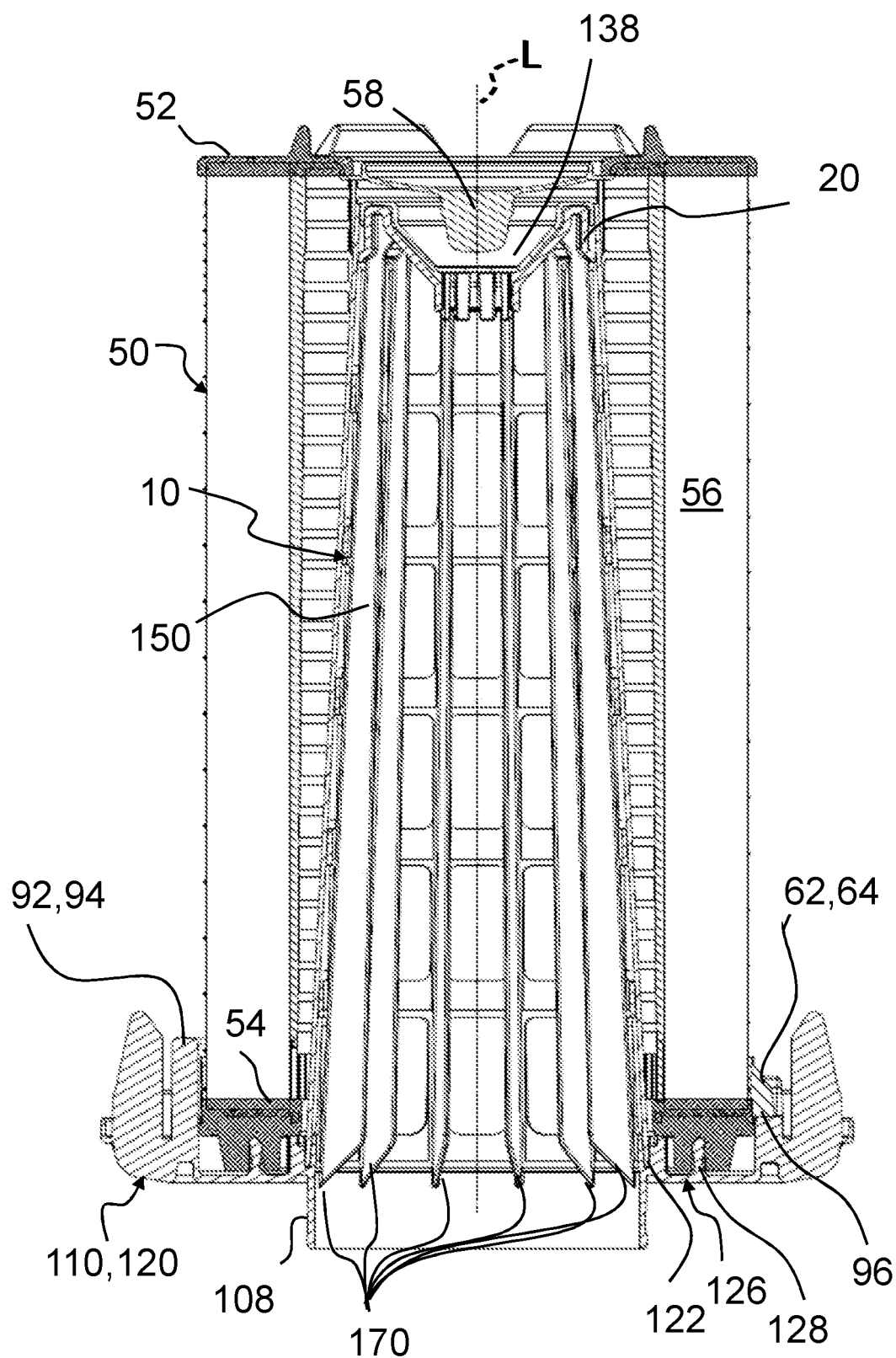
FIG. 12 shows a cut view of the primary filter element according to FIG. 11 where the filter element is arranged at the housing wall in a rotationally defined position with respect to struts of the stand pipe.

FIGS. 11 and 12 illustrate in cut views how the primary filter element 50 according to FIG. 9 is introduced in the bottom housing wall 120. FIG. 11 shows a cut view of the primary filter element 50 in a state where the primary filter element 50 is mounted to the housing wall 120 accommodating the stand pipe 150. The radially extending protrusion 64 is seen on the left side of the drawing where it contacts the maximum region of the guiding surface 94.

FIG. 12 shows a cut view of the primary filter element 50 according to FIG. 11 where the primary filter element 50 is arranged at the housing wall 120 in its final, rotationally defined position with respect to struts 170 of the stand pipe 150. The primary filter element 50 has been turned by 180° about the longitudinal axis L and the radially extending protrusion 64 rests in the notch 96 of the guiding surface 94.

Figure 13:
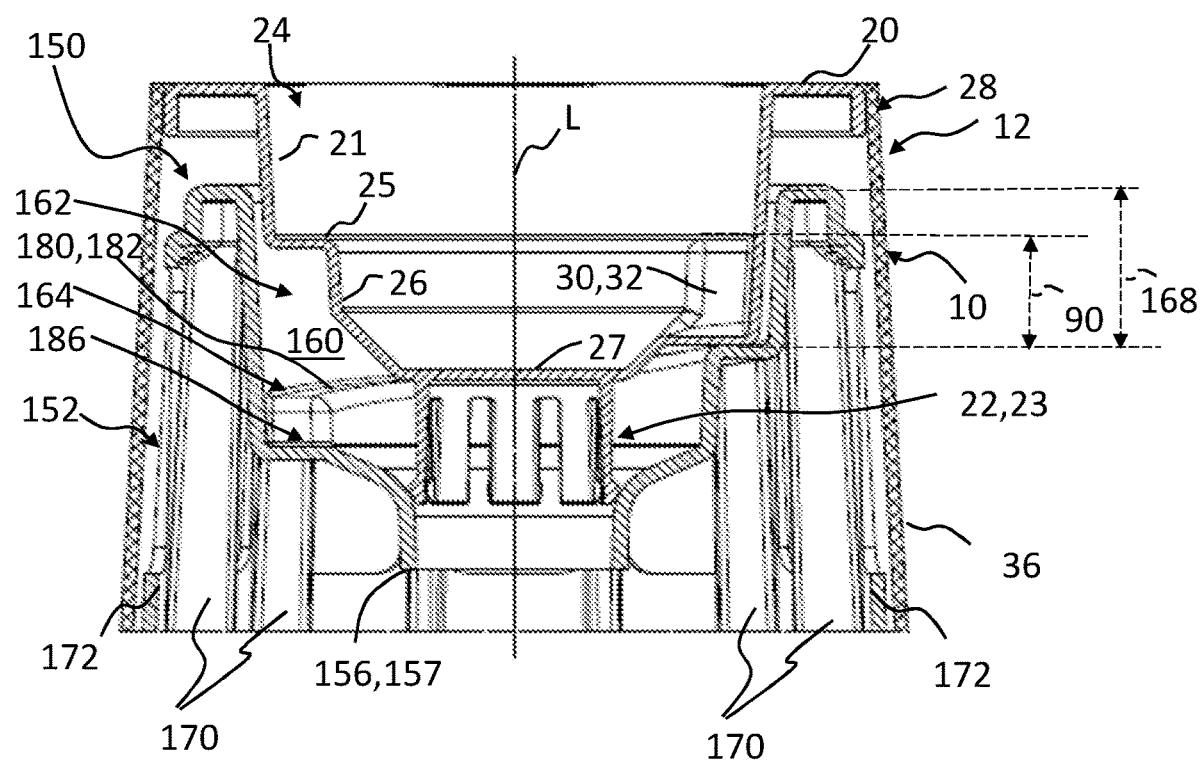
FIG. 13 shows a detailed view of the secondary filter element according to FIG. 3 and the stand pipe according to FIG. 4 making an initial contact during assembly.

FIG. 13 shows an embodiment of a secondary filter element 10 which is mounted to a stand pipe 150 before the secondary filter element 10 is in its final position. To mount the secondary filter element 10 onto the stand pipe 150, the body 36 of the secondary filter element 10 is put over and moved along the stand pipe 150 until the end cap 20 comes close the receptacle 160 of the stand pipe 150.

The end cap 20 enters the receptacle 160 towards the funnel-shaped bottom region of the receptacle 160 with the snap beams 23 first. The end cap 20 can be introduced into the receptacle 160 until the projection element 32 hits the guiding surface 182. The longitudinal extension 90 of the projection element 32 is smaller than the depth 168 of the top segment 162 of the receptacle 160. Thus, the upper segment 21 of the end cap 20 can be immersed partly into the top segment 162 so that the step 25 is safely inside the receptacle 160. As a result, the end cap 20 can be guided further into the receptacle 160 safely without tilting.

The guiding surface 182 has one maximum point 190 in the bottom segment 164 of the receptacle 160 and is inclined on both sides of the maximum point 190. The maximum point 190 of the guiding surface 182 is at the interface between the top segment 162 and the bottom segment 164 of the receptacle 160. By turning the end cap 20 in either direction about the longitudinal axis L the end cap 20 moves further into the receptacle 160 because the projection element 32 is guided on the guiding surface 182 until the projection element 32 reaches the pocket 186 in the guiding surface 182.

The end cap 20 now is moved axially until the projection element 32 is accommodated in the pocket 186. As the snap beams 23 move axially downward, too, they can snap over the rim of the funnel shaped bottom segment 164. The rim is the locking element 157 of the stand pipe 150. The snap beams 23 lock the end cap 20 safely to the stand pipe 150. The end cap 20 may be removed from the stand pipe 150 by an opposite sequence of movement by pulling and turning the end cap 20.

For turning the end cap 20, a tool such as a handle or the like can be applied to the recess 24 of the end cap 20.

With the projection element 32 accommodated in the pocket 186, the secondary filter element 10 is positioned accurately in a well-defined rotational position with respect to the stand pipe 150. Hence, the longitudinal weld seam (not shown) is in a distinct position with respect to the longitudinal struts 170 of the stand pipe 150 and, consequently, to a mass flow sensor arranged at a fixed position close to the filter elements. Preferably, the hooks at the snap beams 23 are provided with inclined surfaces so that these can come loose when some force is applied to the end cap 20.

The length of the end cap 20 with snap beams 23 is matched to the depth of the receptacle 160 so that the snap beams 23 come into contact with the rim, i.e. the locking element 157, of the funnel shaped end of the receptacle 160 with the projection element 32 reaching its end position in the pocket 186. The step 25 of the end cap 20 rests on the maximum point 190 of the guiding surface 182 in the receptacle 160.

What is claimed:

1. A filter system comprising a housing, a fluid inlet formed in a first housing wall, a fluid outlet formed in a second housing wall, a primary filter element and a secondary filter element, the primary filter element and the secondary filter element both being accommodated within the housing,
    wherein the primary filter element is arranged upstream of the secondary filter element, the secondary filter element is arranged on a stand pipe having a longitudinal axis and a plurality of struts disposed about the longitudinal axis, the stand pipe connected to the second housing wall, an inside of the stand pipe in fluid connection with the fluid outlet formed in the second housing wall,
    wherein the primary filter element comprises a filter medium along the longitudinal axis, a first end cap and a second end cap opposite the first end cap having a feedthrough for the stand pipe, and
    wherein the second housing wall and the second end cap of the primary filter element are configured with mutual self-positioning elements to arrange the primary filter element on the second housing wall in a defined rotational position with respect to one or more of the plurality of struts of the stand pipe.

2. The filter system according to claim 1, wherein the mutual self-positioning elements comprise a radially extending protrusion and a guiding surface, the radially extending protrusion being configured to glide along the guiding surface on a relative rotational movement of the primary filter element and the second housing wall about a common rotational axis.

3. The filter system according to claim 2, wherein the radially extending protrusion is arranged on the second end cap of the primary filter element and the guiding surface is provided on the second housing wall.

4. The filter system according to claim 1, wherein the secondary filter element comprises a filter medium forming a body having at least one longitudinal seam along the longitudinal axis.

5. The filter system according to claim 2, wherein the guiding surface includes a notch for accommodating the radially extending protrusion.

6. The filter system according to claim 2, wherein the guiding surface is formed as a ramp which has a maximum region with a maximum height in relation to the longitudinal axis and a minimum region with a minimum height in relation to the longitudinal axis configured such that the radially extending protrusion can glide on the guiding surface from the maximum region to the minimum region when the primary filter element is rotated about the longitudinal axis relative to the second housing wall.

7. The filter system according to claim 6, wherein a notch is arranged in the minimum region for engaging the radially extending protrusion.

8. The filter system according to claim 1, wherein the secondary filter element and the stand pipe are configured with mutual self-positioning elements to arrange the secondary filter element on the stand pipe in a defined rotational position with respect to one or more struts of the stand pipe.

9. The filter system according to claim 8, wherein the mutual self-positioning elements of the secondary filter element and the stand pipe comprise a guiding surface and a projection element, wherein the guiding surface is intended to guide the projection element from an initial position to a final position where the secondary filter element is in the defined rotational position with respect to the one or more struts of the stand pipe, and
    wherein the mutual self-positioning elements comprise a contour arranged at an exterior surface of one of the stand pipe and the secondary filter element and a counter contour at an interior surface of the other one of the stand pipe and the secondary filter element.

10. The filter system according to claim 1, wherein the primary filter element comprises a ring embedded in the second end cap, and wherein the ring comprises a first one of the mutual self-positioning elements.

11. The filter system according to claim 10, wherein the first one of the mutual self-positioning elements extends to an exterior of the filter medium of the primary filter element.

12. The filter system according to claim 1, wherein the first end cap is provided with a protrusion element extending in an axial direction.

13. The filter system according to claim 12, wherein the protrusion element is arranged eccentrically on the first end cap with respect to a center axis of the first end cap.

14. A filter element for a filter system,
    the filter system comprising a housing with a housing wall having a fluid outlet formed in the housing wall,
    the filter element comprising a filter medium, an end cap and a ring on the end cap,
    wherein the filter element is arranged on a stand pipe having a longitudinal axis and a plurality of struts disposed about the longitudinal axis, the stand pipe connected to the housing wall with the stand pipe in fluid connection with the fluid outlet,
    wherein the end cap of the filter element has a feedthrough for the stand pipe,
    wherein the housing wall of the housing and the end cap of the filter element are configured with mutual self-positioning elements to arrange the filter element on the housing in a defined rotational position with respect to one or more of the plurality of struts of the stand pipe, and
    wherein the ring on the end cap of the filter element comprises one of the mutual self-positioning elements that extends to an exterior of the filter medium of the filter element.

15. The filter element according to claim 14, wherein the mutual self-positioning elements comprise a radially extending protrusion and a guiding surface, the radially extending protrusion configured to glide along the guiding surface with a relative rotational movement of the filter element and the housing wall about a common rotational axis.

16. The filter element according to claim 15, wherein the radially extending protrusion is arranged on the end cap of the filter element and the guiding surface is provided on the housing wall, and wherein the guiding surface includes a notch for accommodating the radially extending protrusion.

17. The filter element according to claim 15, wherein the guiding surface is formed as a ramp having a maximum region with a maximum height in relation to the longitudinal axis and a minimum region with a minimum height in relation to the longitudinal axis configured such that the radially extending protrusion glides on the guiding surface from the maximum region to the minimum region when the filter element is rotated about the longitudinal axis relative to the housing wall.

18. A filter system, comprising:

a housing with a housing wall having a fluid outlet formed in the housing wall, a filter element comprising a filter medium and an end cap, wherein the filter element is arranged on a stand pipe having a longitudinal axis and a plurality of struts disposed about the longitudinal axis, the stand pipe connected to the housing wall with the stand pipe in fluid connection with the fluid outlet, wherein the end cap of the filter element has a feedthrough for the stand pipe, wherein a first self-positioning element is provided on the housing wall of the housing to cooperate with a corresponding second self-positioning element provided on the end cap of the filter element, wherein the first self-positioning element and the second self-positioning element arrange the filter element on the housing in a defined rotational position with respect to one or more of the plurality of struts of the stand pipe, and wherein the first self-positioning element is configured as a guiding surface surrounding the stand pipe and having a maximum height region and a minimum height region arranged diametrically vis-á-vis the maximum height region.

19. The filter system according to claim 18, wherein a notch is arranged in the minimum height region of the first self-positioning element provided on the housing wall of the housing for engaging the second self-positioning element provided on the end cap of the filter element.

\* \* \* \* \*